United States Patent [19]

Richardson

[11] 3,761,553

[45] Sept. 25, 1973

[54] METHOD FOR PRODUCING UNIFORM DRAWN FILMS

[75] Inventor: Jerry Grant Richardson, Simpsonville, S.C.

[73] Assignee: Celanese Corporation, New York, N.Y.

[22] Filed: June 28, 1971

[21] Appl. No.: 157,216

[52] U.S. Cl. ............... 264/40, 264/210 R, 264/289, 264/327, 425/141, 425/144, 425/172
[51] Int. Cl. ........................ B29d 7/24, B29f 3/08
[58] Field of Search ...................... 264/40.216, 288, 264/289, 210 R, 327; 425/141, 144, 172

[56] References Cited
UNITED STATES PATENTS

| | | | |
|---|---|---|---|
| 3,212,127 | 10/1965 | Flook, Jr. et al. | 425/29 |
| 3,347,960 | 10/1967 | Fenley | 264/40 |
| 3,341,388 | 9/1967 | Bunyea | 264/40 |
| 3,125,616 | 3/1964 | Cook et al. | 264/40 |
| 3,649,726 | 3/1972 | Knowles | 264/40 |
| 3,161,711 | 12/1964 | Tassler | 264/289 |
| 2,995,779 | 8/1961 | Winter | 264/289 |

Primary Examiner—Jeffery R. Thurlow
Assistant Examiner—Jeffery R. Thurlow
Attorney—Thomas J. Morgan et al.

[57] ABSTRACT

An improved method for producing a biaxially drawn thermoplastic film of substantially uniform thickness throughout its width has been discovered by controlling heat at the die opening where film is extruded by employing a plurality of heaters which do not exceed 3 inches in width mounted along the edge of the die opening, said heaters being responsive in relation to the thickness measurement of a plurality of loci across the width of the drawn sheet to maintain thickness of the film substantially constant.

6 Claims, 3 Drawing Figures

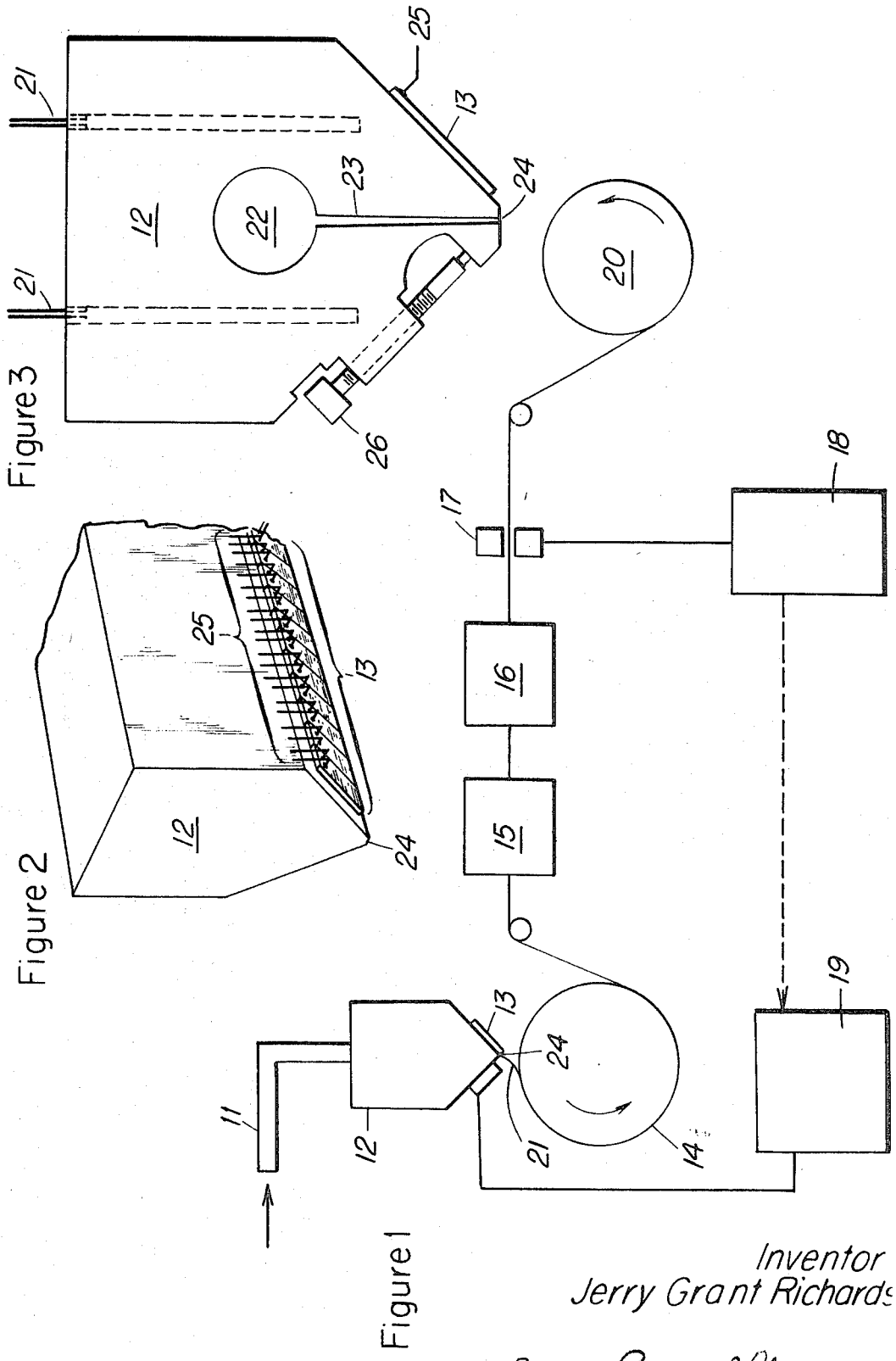

METHOD FOR PRODUCING UNIFORM DRAWN FILMS

BACKGROUND OF THE INVENTION

This invention relates to a method for producing a biaxially drawn thermoplastic film having substantially uniform thickness throughout its width. More particularly, this invention relates to an improved method for finely controlling the effective extrusion of the thermoplastic polymer which flows through the die opening in relation to the thickness measurement of the subsequent biaxially drawn film to maintain the thickness of the film substantially constant.

There have been methods described in the art for the uniform extruding of thermoplastic film. However, when the film must be biaxially drawn after the extrusion step to provide the desired tensile properties, these techniques are not sufficient to produce a drawn film having uniform thickness throughout its width. Typical of the prior art is U.S. Pat. No. 3,341,388 which describes the method of producing a thermoplastic film of uniform thickness across the width of the sheet by utilizing the proper adjustment of the position of the die jaws and controlling the amount of heat added to each of a plurality of contiguous zones spaced along the width of the body of the die. The heat, added throughout the die body parallel to the width of the die slot, is controlled from a measurement of the thickness of the extruded sheet whereas the thickness of the sheet at a plurality of loci determines the amount of heat which is added to the die body heaters. This procedure is satisfactory for the coating of paper with polyethylene or polypropylene but is not satisfactory for the production of more uniform drawn films such as polyester, nylon, or polypropylene.

SUMMARY OF THE INVENTION

An improved method has now been discovered wherein a biaxially drawn film can be produced having substantially uniform thickness throughout its width. It has been found that on the extrusion of molten thermoplastic through a predetermined die opening having a width substantially that of the thermoplastic film, the temperature of the die opening is controlled by heaters not exceeding three inches in width located along the width of the die opening. The extruded film is withdrawn at a substantially constant rate, drawn in the desired directions and the thickness of the drawn film is measured at a plurality of loci across the width of the film. The heat is controlled to the thermosplastic in the die opening corresponding to the loci of measurement of film thickness in amounts sufficient to maintain the thickness of the biaxially drawn film substantially constant.

The advantages of the invention will be apparent to those skilled in the art upon reading the disclosure including the detailed description of the invention and the drawings wherein:

FIG. 1 is a schematic flow diagram of an extrusion and drawing operation according to the invention.

FIG. 2 is a fragmentary perspective view of the die body;

FIG. 3 is a front elevation of the die body.

Referring now to the drawing, a system according to the invention is schematically illustrated in FIG. 1 wherein molten thermoplastic is transported from the melt supply through pipe 11 into the die body 12. The film 21 is extruded trhough the die opening 24 which is heated by a plurality of die opening heaters 13 placed in sequence over the width of the die opening 24 and corresponding at least to the film 21 being extruded. The film 21 is extruded onto a casting drum 14 and in the case of polyethylene terephthalate films passed through the drawing stages 15 and 16. These drawing stages can be sequential in the machine direction and then in the transverse direction or vice versa. The thickness of the drawn film 21 is then measured at various locations across the width of the film by means of a traversing beta gauge 17 which outputs a signal proportional to the thickness of the film 21. The output of the beta guage 17 is transmitted to a beta gauge control station 18 and this information is used to activate control 19 of the appropriate die opening heater. The thickness measurements are utilized to determine the variation in thickness of the film from a previously determined model thickness profile. The amount of variation is then translated to a required amount of heat to be applied to the die opening heaters by use of the various variable voltage sources connected to each die opening heater. For example, if the thickness of an area of film is too great, the appropriate amount of heat is reduced to the die opening heater which corresponds to that particular area thus reducing the excessive thickness. On the other hand, if the thickness of an area of the film is not sufficient, the appropriate amount of heat is increased to the die opening heater which corresponds to that particular area thus increasing the thickness to the desired level. In this manner, the heat is controlled to the thermoplastic in the die opening corresponding to the loci of measurement of film thickness in amounts sufficient to maintain the thickness of the film substantially constant. The finished film 21 is then wound on a wind up roll 20 for further processing.

FIG. 2 is a fragmentary view of the die body 12 containing the die opening 24. The plurality of the die opening heaters 13 are located sequentially along the edge of the die opening 24 with the electrical wires 25 connected to the die opening heater control unit 19 as shown in FIG. 1.

FIG. 3 is a front elevation of the die body 12. Contained within the die body 12 are the die zone heaters 21 generally maintained at constant temperatures. Also contained within the die body 12 is the melt flow channel 22, melt distribution land 23 and the die opening 24. The thickness of the die opening 24 is coarsely adjusted by a plurality of die bolts 26 and the melt flow profile is finely controlled by the plurality of die opening heaters as shown by 13 supplied by electrical current by wires 25 from controllers 19.

The type of heaters which can be used at the die opening are any conventional heaters which have suitable temperature controls. The preferred heaters are the electrical heaters which range in width up to 3 inches, preferably in the range of 0.5 to 3 inches and more preferably 0.5 to about 2 inches. The width of the heater is meant to indicate that position along the length of the die opening. The temperature of the die opening heaters must be greater than that of the die body to have the desired effect. The die body temperature must be maintained to keep the thermoplastic material in a molten state suitable for extruding films. The temperatures are dependent on the type of biaxially drawable thermoplastic material used having intrinsic viscosities capable of producing acceptable films.

These thermoplastic materials include polyalkylene terephthalate, preferably polyethylene terephthalate, nylon such as nylon 66, nylon 6 and the like, and polypropylene and the like.

The drawing conditions which are utilized in the process of this invention are such to provide the desirable strength conditions and generally exceed 2.5 times the original dimensions especially for polyethylene terephthalate. The preferred drawing conditions can range from 2.8 to as high as 5.0 the original dimensions but generally the drawing conditions range from 3.0 to 4.0 the orginal dimensions. The sequence of draw is optional wherein the initial draw can be in the machine direction and the subsequent draw can be in the transverse direction. The reverse draw situation such as transverse direction, first, followed by machine direction can also be used, if desired.

The thickness guages are utilized after the final drawing step and can be any commercially available gauges such as pneumatic gauges, beta gauges and the like. All of the control instruments such as temperature controllers are conventional and are commercially available.

The following examples serve to illustrate the process of the invention without limiting the same.

EXAMPLES

Utilizing the procedure as described in FIG. 1, polyethylene terephthalate having an intrinsic viscosity of 0.62 deciliters per gram (measured in orthochlorophenol) was extruded into a film 28 inches wide, and a thickness of about 11 mils cast on a quenching drum, drawn 3.5 times its dimensions in the machine and transversed directions to produce a 0.92 mil film and measured by a beta gauge which provides information for controlling the die lip opening heaters to provide an improved biaxially drawn film thickness uniformity having thickness variations from about 2 to 3 percent over the entire width of the films utilizing the die opening heaters. The melt is heated at the last possible opportunity with contiguous die opening heaters, each 1½ inches in width. The die opening heater under these conditions can be made to effect a relatively narrow width of from about 1.5 to about 2 inches in the cast sheet and about 5 to 6 inches in the final biaxially drawn film. Utilizing die opening heaters in excess of 3 inches such as 4 inches in width affords a coarse thickness control wherein a relatively wide width of from 4 to 6 inches in the cast film and from about 15 to about 20 inches in the final drawn film are controlled in each drawing zone. This type of control provides a thickness variation ranging from 5 percent to as high as about 12 percent in 0.92 mil film. Utilizing die heaters in excess of about 3 inches provides the same control as the technique of U.S. Pat. No. 3,341,388 wherein the die body is heated in specific areas. This provides a coarse temperature control and the thickness variations are no better than the die opening heaters exceeding 3 inches in length. The distinct advantages of this invention are as follows: the fine and very specific gauge control of a drawn film; outstanding stability over extended periods of time of the gauge profile once the desired profile is established; improved consistency in film quality is also observed which is the highly desired feature in film production.

In similar manner as above, nylon and polypropylene will also provide the improvements following the processing techniques of this invention.

It is understood that the foregoing description is merely illustrative of preferred embodiments of the invention of which many variations may be made by those skilled in the art within the scope of the following claims without departing from the spirit thereof.

What is claimed is:

1. In a method for producing biaxially drawn thermoplastic film in which thermoplastic melt is extruded through a die opening having a width substantially equal to the width of the extrudate, the extrudate drawn at a constant rate onto a casting drum to form a film, the film drawn in both machine and transverse directions, the thickness of the biaxially drawn film measured at a plurality of loci across the width of the film, the measured thickness of the drawn film resulting in the generation of signals proportional to said film thickness, and a plurality of heaters, responsive to said signals, activated to provide substantially uniform thickness throughout the film width the improvement which comprises disposing said heaters, which do not exceed 3 inches in width as measured along the length of the die opening, on the die along the edge of the die opening.

2. The improved method of claim 1 wherein the temperature of the die opening is controlled by heaters ranging in width from about 0.5 inch to about 3 inches along the length of the die opening.

3. The improved method of claim 2 wherein the temperature of the die opening is controlled by heaters ranging from 0.5 inch to about 2 inches along the length of the die opening.

4. The improved method of claim 1 wherein the thermoplastic film is composed of polyethylene terephthalate and the film is drawn in the length and width directions at least 2.5 its original dimensions.

5. The improved method of claim 4 wherein the temperature of the die opening is controlled by heaters ranging in width from about 0.5 inch to about 3 inches along the length of the die opening.

6. The improved method of claim 5 wherein the temperature of the die opening is controlled by heaters ranging from 0.5 inch to about 2 inches along the length of the die opening.

* * * * *